(12) United States Patent
Kinoshita et al.

(10) Patent No.: US 6,670,752 B2
(45) Date of Patent: Dec. 30, 2003

(54) CATHODE FOR EMITTING PHOTOELECTRON OR SECONDARY ELECTRON, PHOTOMULTIPLIER TUBE, AND ELECTRON-MULTIPLIER TUBE

(75) Inventors: Masao Kinoshita, Hamamatsu (JP); Hiroyuki Watanabe, Hamamatsu (JP); Rie Nishiura, Hamamatsu (JP)

(73) Assignee: Hamamatsu Photonics K.K., Shizuoka (JP)

( * ) Notice: Subject to any disclaimer, the term of this patent is extended or adjusted under 35 U.S.C. 154(b) by 0 days.

(21) Appl. No.: 10/181,360
(22) PCT Filed: Jan. 16, 2001
(86) PCT No.: PCT/JP01/00213
§ 371 (c)(1), (2), (4) Date: Jul. 17, 2002
(87) PCT Pub. No.: WO01/54157
PCT Pub. Date: Jul. 26, 2001

(65) Prior Publication Data
US 2003/0001497 A1 Jan. 2, 2003

(30) Foreign Application Priority Data
Jan. 16, 2000 (JP) .............................. 2000-7972

(51) Int. Cl.$^7$ .............................. H01J 1/34; H01J 40/06
(52) U.S. Cl. ................... 313/542; 313/532; 313/103 R; 313/399; 250/207
(58) Field of Search ................................ 290/214, 207; 313/523, 528, 536, 531, 532, 533, 537, 535, 540, 541, 542, 103 R, 103 CM, 104, 105 R, 105 CM, 399

(56) References Cited

U.S. PATENT DOCUMENTS

| 5,463,272 | A | 10/1995 | Watase et al. ............. 313/373 |
| 5,619,091 | A | 4/1997 | Anderson et al. ........... 313/103 |
| 2002/0167254 | A1 * | 11/2002 | Craig et al. ............ 313/103 R |

FOREIGN PATENT DOCUMENTS

| JP | 8-83561 | 3/1996 |
| JP | 2500209 | 3/1996 |
| JP | 2651329 | 5/1997 |
| JP | 10-149761 | 6/1998 |
| JP | 11-120899 | 4/1999 |

* cited by examiner

Primary Examiner—Nimeshkumar D. Patel
Assistant Examiner—Sharlene Leurig
(74) Attorney, Agent, or Firm—Morgan, Lewis & Bockius LLP

(57) ABSTRACT

The cathode for photo-electron emission 5 is comprised of an alkali metal containing layer 5d made of material for emitting photo-electrons by the entry of light or for emitting secondary electrons by the entry of electrons, such as particles which consist of an alkali antimony compound, on an Ni electrode substrate 5c on which an Al layer 5b is deposited, and has an intermediate layer 5a made of carbon nano-tubes between the alkali metal containing layer 5d and the Ni electrode substrate 5c, therefore the defect density inside the particles is decreased, and the recombining probability of electrons and holes drops remarkably, which improves the quantum efficiency.

10 Claims, 9 Drawing Sheets

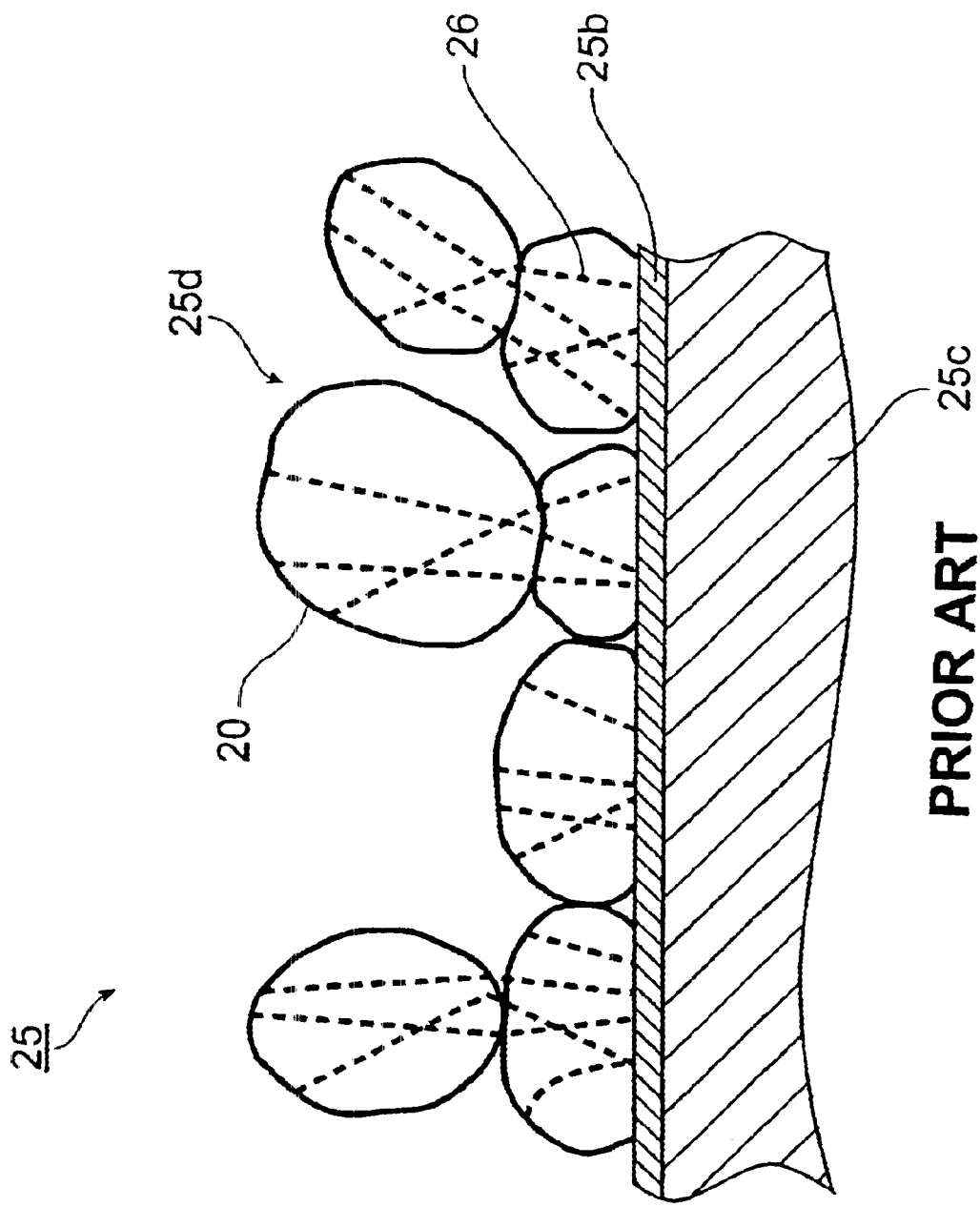

CATHODE FOR EMITTING PHOTOELECTRON OR SECONDARY ELECTRON, PHOTOMULTIPLIER TUBE, AND ELECTRON-MULTIPLIER TUBE

TECHNICAL FIELD

The present invention relates to an electron emitting cathode for emitting photo-electrons or secondary electrons, and this cathode is applied to a photomultiplier, for example.

BACKGROUND ART

A conventional cathode for photo-electron or secondary electron emission is, for example, one stated in the Official Gazette on Japanese Patent Laid-Open No. 6-119872 (registered patent No. 2651329) claimed by the present applicant.

FIG. 8 is a perspective view depicting an example of this conventional cathode for photo-electronemission. The cathode for photo-electron emission 25 is comprised of a thin film 25d, where compound particles of alkali metal and antimony (Sb) are deposited on a nickel (Ni) electrode substrate 25c covered with an aluminum (Al) layer 25b. In this conventional cathode for photo-electron emission, the diameter of a particle constituting the thin film 25d is about the diffusion wavelength of an excited electron, where an improvement of electron emission efficiency (quantum efficiency) has been intended.

DISCLOSURE OF THE INVENTION

In a cathode for photo-electron emission, quantum efficiency normally depends on wavelength. In the case of a device using a cathode for photo-electron emission for detecting light, electrons or other charged particles, such as a photomultiplier, high quantum efficiency is generally desired in the entire wavelength region of the detection target or in a particle energy region wider than this area. In many cases, high quantum efficiency (red sensitivity) for wavelengths of about 600 to 800 nm of red to near infra-red is demanded. Whereas in the above mentioned conventional cathode for photo-electron emission, sensitivity in the wavelength region of about 600 to 800 nm is relatively low, and further improvement of red sensitivity has been desired.

With the foregoing in view, it is an object of the present invention to provide a cathode for photo-electron or secondary electron emission where quantum efficiency, particularly red sensitivity, can be improved, and the spectral sensitivity (photo-electron emission characteristic) or the secondary electron emission characteristic is improved. It is another object of the present invention to provide a photomultiplier and electronic multiplier having an excellent photo-electron emission characteristic or secondary electron emission characteristic.

To solve the above problems, the present inventors have eagerly researched the crystal particle growth process and film characteristics of a conventional cathode for photo-electron emission, where a thin film comprised of crystal particles of alkali antimony compound semiconductor is formed on an Al deposited substrate, and as a result the following was found out.

FIG. 9 is an enlarged cross-sectional view depicting the structure of the cathode for photo-electron emission 25 in FIG. 8 in cross-section IX—IX. As FIG. 9 shows, strain stress, which is generated by the differences of the thermal expansion coefficient and lattice constant with the Ni electrode substrate 25c, is applied to the particles 20 contacting the Al film 25b, and crystal defects 26 are generated as a result of relaxing this stress.

Here in the cathode for photo-electron emission 25, the cross-section of the particles 20 at the contact area tends to flatten due to the wettability between the Al film 25b and the particles 20. If this occurs, the strain stress applied to the particles 20 is increased, and the density of crystal defects 26 (defect density) increases. Also inside the particles which grow on the crystal particles 20 at the contact area, defects originating from a line defect or plane defect of the particles below are sequentially generated, and the defect density of an entire crystal particle 20 increases. In a crystal defect 26, the probability that an electron, excited by light or electrons, will recombine with a hole increases, and excited electrons which reach the surface of the crystal grain 20 decreases, which drops the quantum efficiency. The present inventors further promoted research based on these findings, and completed the present invention.

The present cathode for photo-electron or secondary electron emission is a cathode for photo-electron or secondary electron emission, comprising a thin film made of a material for emitting photo-electrons by the entry of light or for emitting secondary electrons by the entry of electrons, preferably a compound of at least one type of alkali metal and antimony metal, is formed on a substrate, characterized in that an intermediate layer comprised of carbon is disposed between the thin film and the substrate.

In the case of a cathode for photo-electron or secondary electron emission configured like this, a thin film, as a photo-electron emitting face, or a secondary electron emitting face for emitting photo-electrons or secondary electrons, is formed on the intermediate layer comprised of carbon disposed on the substrate. If this thin film is formed by depositing particles comprised of the above mentioned material for emitting photo-electrons or secondary electrons, photo-electrons or secondary electrons are emitted from the particles when light or primary electrons enter the particles constituting the thin film. Here it was found out that the deposited particles contacting the intermediate layer do not flatten, but maintain an elliptical shape, unlike prior art. The mechanism for such an interaction is not sufficiently understood, but it was confirmed that strain stress to be applied to the particles during particle growth is decreased, and internal crystal defects decrease.

Since the defect density of particles at the contact section with the intermediate layer decreases, defects which extend the crystal defects of the particles below are decreased in the grains which grow on the particles at the contact section. Therefore the crystal defect density in the particles of the entire thin film decreases the recombining probability of electrons excited by light or electrons and holes decreases remarkably, and the decrease of excited electrons reaching the surface of particles is controlled. Also even if the thin film is not formed by deposition of individually separated independent particles or particulate matter, and has such a deposition structure where many particles are connected together, or are in a state close to the film, crystal defects can be decreased since the above mentioned strain stress decreases.

It is preferable that the intermediate layer contains carbon nano-tubes. On the surface of the intermediate layer where particles of carbon nano-tubes are layered, micro-bumps in a nano-meter order are created. Such a shape and material characteristic drops wettability on the surface of the intermediate layer with respect to the particles constituting the thin film, which further controls the particles constituting the thin film to be deposited in a flattened state (such an interaction is not limited to this). As a result, the defect density in particles is further decreased, where the recombining probability of electrons and holes is further dropped, and the decrease of excited electrons which reaches the particle surface is further controlled.

It is also preferable that the thin film is activated by alkali metal, or that the thin film is comprised of a compound (alkali antimony compound) which consists of at least one type of alkali metal and antimony (Sb), particularly bi-alkali or a multi-alkali antimony compound.

The present photomultiplier or electronic multiplier has the above mentioned cathode for photo-electron emission or a cathode for secondary electron emission respectively. In other words, the present photo multiplier is characterized in that the above mentioned cathode for photo-electron emission is installed inside a vacuum container which has a light entrance window, where photo-electrons, which are emitted from the cathode for photo-electron emission by the incident light, are multiplied inside the vacuum container. The secondary electron multiplier is characterized in that the cathode for secondary electron emission of the present invention is installed in stages inside the container, where electrons to be detected enter the cathode for secondary electron emission at the first stage, and the secondary electrons emitted by the cathode for secondary electron emission at the last stage enter the anode. The "vacuum container" is a sealed container where pressure inside the container is reduced to be roughly a vacuum.

BRIEF DESCRIPTION OF THE DRAWINGS

FIG. 9 is an enlarged cross-sectional view depicting the structure of a conventional cathode for photo-electron emission.

BEST MODE FOR CARRYING OUT THE INVENTION

Embodiments of the present invention will now be described with reference to the accompanying drawings. The same composing elements are denoted with the same symbols, where redundant descriptions are omitted.

Figure 1:
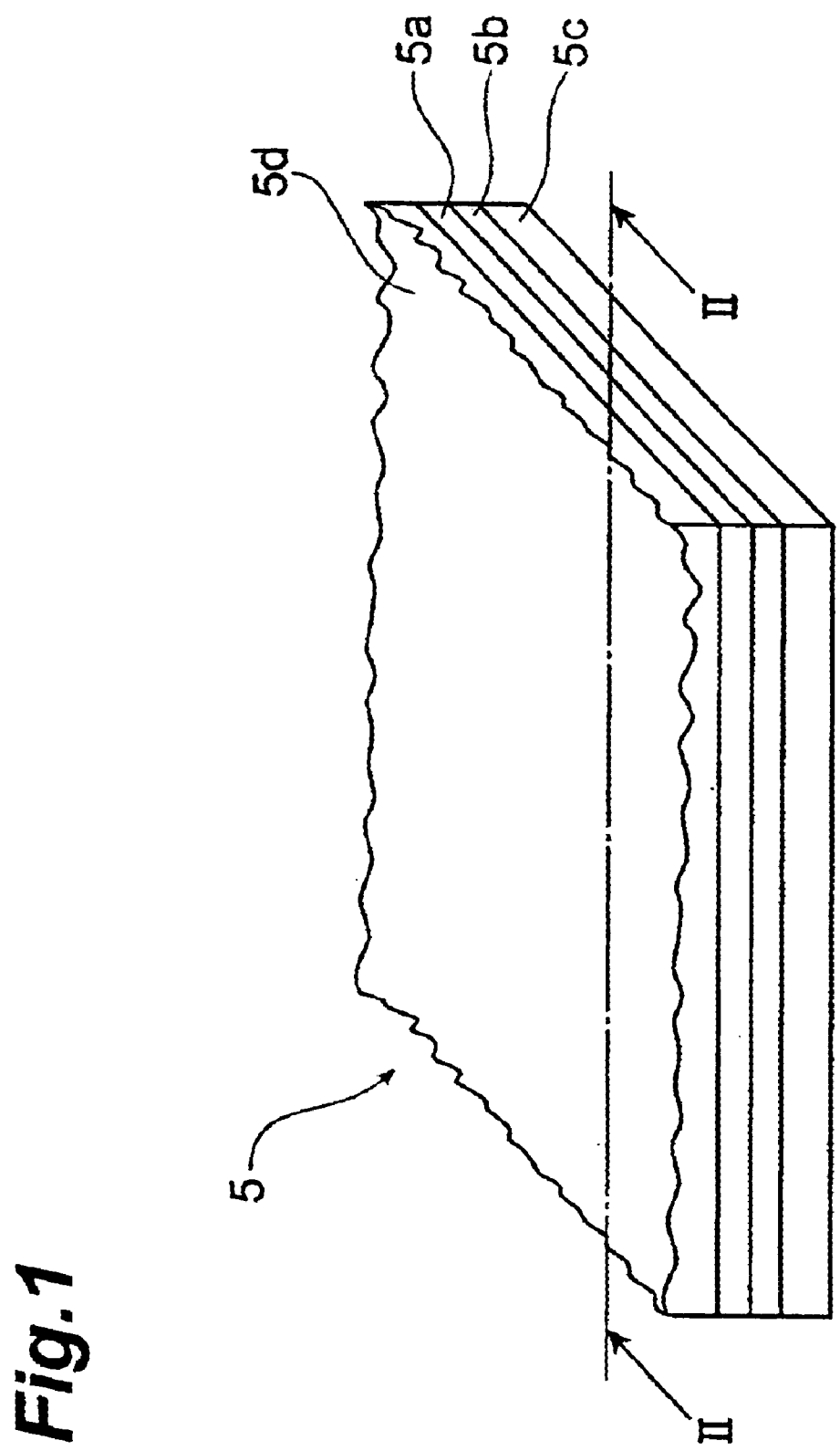
FIG. 1 is a perspective view of a cathode depicting a preferred embodiment of the cathode for photo-electron emission.

FIG. 1 is a perspective view of a cathode depicting a preferred embodiment of the cathode for photo-electron emission. The cathode for photo-electron emission 5 (cathode for photo-electron emission) is comprised of (2) metal layer 5b, (3) intermediate layer 5a, and (4) alkali metal containing layer (photo-electric face: thin film) 5d, which are sequentially layered on (1) substrate 5c. The description follows.

(1) Substrate 5c

This is a substrate made of substrate 5c metal, and the metal is made of Ni, in this example, but may be Al or stainless. The surface of the substrate 5c may be mildly oxidized.

(2) Metal Layer 5b

The metal layer 5b is made of Al, and this Al, which functions as a reflection film when light enters, may be Ni. The cathode for photo-electron emission 5, in this example, is a reflection type, but the cathode 5 may be a transmission type where the intermediate layer 5a and the alkali metal containing layer 5d are sequentially formed on the substrate 5c having a translucency, such as glass or sapphire. An oxide layer of manganese (manganese oxide) maybe formed between the substrate 5c and intermediate layer 5a.

(3) Intermediate Layer 5a

The intermediate layer 5a is a layer containing carbon, and is comprised of carbon nano-tubes in this example. A carbon nano-tube is a cylindrical material where one layer of graphite (graphine) is rolled into a cylinder. The primary cylindrical material, all made of carbon atoms, are microcrystals which diameter is about 0.5 nm to 10 nm, and the length is about 1 $\mu$m. One nano-tube normally has a special structure called a "helical structure".

A method for layering the intermediate layer 5a made of carbon nano-tubes on the Al layer 5b is not especially limited, but, for example, may involve dropping a predetermined amount of a suspended carbon nano-tube solution, where carbon nano-tubes are suspended or dispersed in such a solvent as alcohol, on the Al layer 5b, and removing the solvent by drying. And the thickness of the intermediate layer 5a is not especially limited if the particles of carbon nano-tubes are evenly deposited on at least one layer. Also the shape of a carbon nano-tube to be used is not limited, and may, for example, be a normally synthesized carbon nano-tube which diameter is about 0.1—several tens nm, and the length is about 1 $\mu$m or less.

The stereoscopic structure of the carbon nano-tube is not limited either, where any one of a chiral tube type (n, m: n≠m and m≠0), arm chair type (n, m: n=m), and zigzag tube type (n, m: m=0) may be used, and carbon nano-tubes having these stereoscopic structures may be mixed. The above mentioned (n, m) shows the chiral vector (where $0 \leq |n| \leq m|$. The deposition direction of the particles of the carbon nano-tube is not especially limited either. In other words, the longitudinal direction of a carbon nano-tube having a cylindrical shape, such as a needle shape, and the plane of the Al layer 5b, maybe in parallel or form an angle.

For the material of the intermediate layer 5a, such carbon material as graphite, amorphous carbon, or fullerene of carbon (e.g. C60, C70, C84) may be used alone or together with carbon nano-tubes with or without mixing, but it is preferable that a carbon nano-tube is the main component. The particle diameter of such a carbon material is preferably similar to the above mentioned diameter of a carbon nanotube or less.

(4) Alkali Metal Containing Layer 5d

The alkali metal containing layer 5d (photo-electric face: thin film) is comprised of grown and deposited particles which emit photo-electrons by the entry of light or which emit secondary electrons by the entry of electrons. In the description, "photo-electric face" and "secondary electron emitting face" show the entire thin film having a predetermined thickness, where particles or particulate matter are deposited or combined, that is, the alkali metal containing layer 5d.

The material of the particles constituting the alkali metal containing layer 5d is preferably a metal compound containing at least one metal element selected from groups comprised of such alkali metal as cesium (Cs), sodium (Na), potassium (K), and antimony (Sb), that is, an alkali antimony compound.

Micro-bumps are formed on the surface of the alkali metal containing layer 5d by the particles. It is preferable that the average particle diameter is about the diffusion length of a photo-electron, that is, about 500 nm, for example, and the height from the concave part to the convex part on the surface of the alkali metal containing layer 5d is about 1000 nm, and the space between the convex parts (or concave parts) is about 1000 nm.

The alkali metal containing layer 5d comprised of many particles can be formed by normal vapor phase epitaxy, where an alkali metal stream is reacted with Sb particulate film deposited in an inactive gas, such as argon (Ar), Neon (Ne), or hydrogen ($H_2$).

The photo-electron emission mechanism by such an alkali metal containing layer 5d is described in detail in Japanese Patent Laid-Open 6-119872 (registered patent No. 2651329) by the present applicant.

Figure 2:
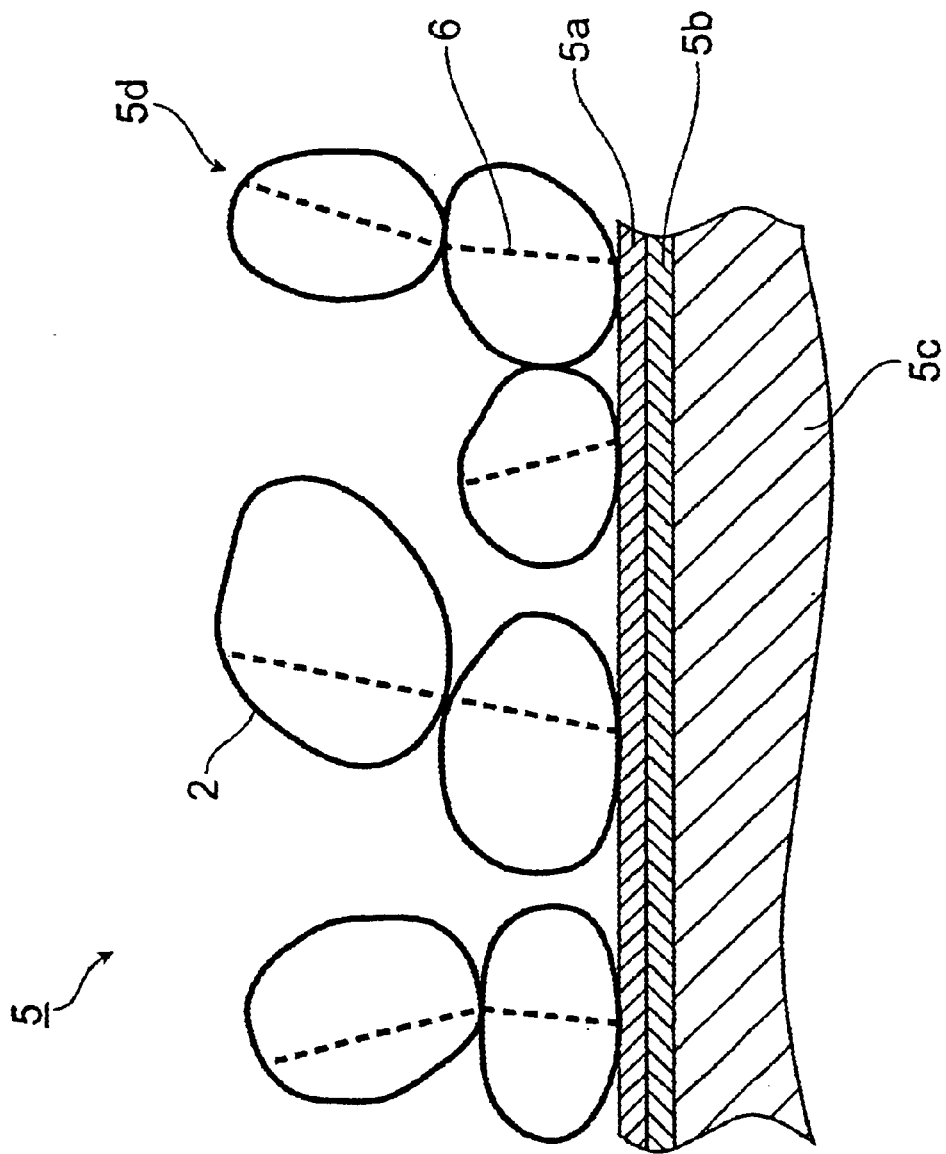
FIG. 2 is an enlarged cross-sectional view of a cathode depicting the structure of the cathode for photo-electron emission.

FIG. 2 is an enlarged cross-sectional view depicting the structure of the II—II cross-section in FIG. 1.

As FIG. 2 shows, in the cathode for photo-electron emission 5, particles contacting the intermediate layer 5a do not deform to a flat state (status of the prior art shown in FIG. 9), and the particles 2 have an elliptical shape. The contact area between the intermediate layer 5a and the particle 2 contacting on the surface thereof is smaller than prior art.

The principle where the particles 2 contacting the intermediate layer 5a do not become a flat state, unlike prior art, in the alkali metal containing layer 5d constituting such a cathode for photo-electron emission 5, has not yet been clearly understood, but can be assumed to be as follows.

One presumption is that wettability on the surface of the intermediate layer 5 with respect to the particle 2 becomes lower than prior art, which does not have the intermediate layer 5a, because of the relationship of the surface free energy between the intermediate layer 5a comprised of carbon nano-tubes and the particles 2. It is also presumed that the surface free energy of the intermediate layer 5a depends on material characteristics and/or shape, and one reason is that the material of the intermediate layer 5a is carbon, and a micro-curvature in a nano-meter order is generated on the surface of the intermediate layer 5a.

Another possible reason is that the strain stress applied to the particles 2 is relaxed by the intermediate layer 5a, and the surface tension of the intermediate layer 5a (interfacial tension with particles 2) is increased, which accelerates the condensation of particles. The interactions, however, are not limited to these.

Conventionally a carbon material, such as graphite, has been difficult to use for a cathode having a photo-electric face containing alkali metal, because of the intercalation effect, which takes heterogeneous atoms into a layered structure. However if an intermediate layer 5a comprised of carbon is created, crystal defects in the particles 2 are decreased, and sensitivity is improved, as mentioned later, regardless which one of the above mentioned interactions is dominant.

According to the cathode for photo-electron emission 5 having such a configuration, the degree of contact between the particles 2 and the intermediate layer 5a is less than prior art, so the strain stress to be applied when crystals of the particles 2 grow decreases, and as FIG. 2 shows, the generation of crystal defects 6 inside the particles 2 and propagation thereof are controlled, as shown in FIG. 2. Therefore defects which extend inside the particles 2 which are sequentially grown and deposited on the particles 2 are decreased. Since the density of crystal defects 6 inside the particles 2 in the entire alkali metal containing layer 5d is decreased, the recombining probability between electrons excited by light or electrons and holes decreases remarkably. As a result, the decrease of excited electrons which reach the surface of the particles 2 is controlled, so quantum efficiency can be improved, and the spectral sensitivity characteristic thereof can be improved compared with prior art.

Also the intermediate layer 5a is comprised of carbon nano-tubes, and micro-bumps having a curvature in the micro-pore order, or sub-micro-pore order to meso-pore order, can be formed on the surface of the intermediate layer 5a (interface with the particles 2) by the layering of carbon nano-tubes. Therefore wettability of the intermediate layer 5a with respect to the particles 2 sufficiently drops, and particles 2 tend to be deposited in an elliptical shape. As a result, the density of crystal defects 6 inside the particles further decreases. So the quantum efficiency of a cathode for photo-electron or secondary electron emission can be further increased, and spectral sensitivity thereof can be further improved.

A preferable embodiment of the cathode for secondary electron emission is one having a configuration similar to the cathode for photo-electron emission 5 shown in FIG. 1. In this case, the alkali metal containing layer 5d is the primary electron entering face (secondary electron emitting face), where incident primary electrons reflected by the cathode surface also enter the cathode for secondary electron emission, and contribute to secondary electron emission.

Figure 3:
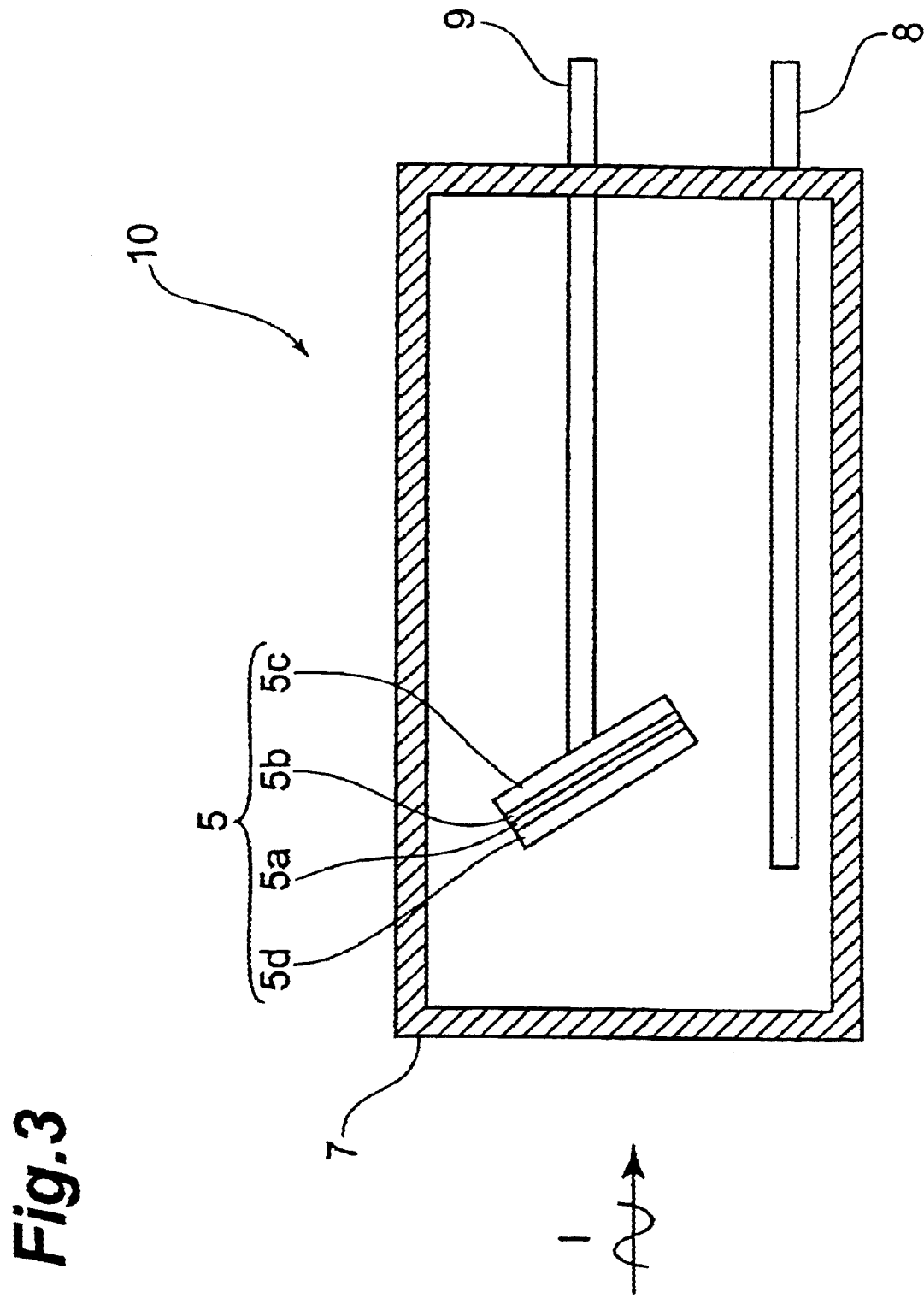
FIG. 3 is a cross-sectional view of a photo-electric tube depicting an embodiment of a photo-electronic tube where the cathode for electron emission is used as a reflection type photo-electric cathode.

FIG. 3 is a cross-sectional view of a photo-electric tube depicting an embodiment of the photo-electric tube using the above mentioned cathode for photo-electron emission 5 as a reflection type photo-electric cathode.

The photo-electric tube 10 is a cathode for photo-electron emission 5, anode 8 comprised of Ni, and lead-in wire 9 installed in the glass cylinder 7, which is a vacuum container. In the photo-electric tube 10 with such a configuration, incident light 1, which is photons to be detected, enters the alkali metal containing layer 5d of the cathode for photo-electron emission 5, photo-electrons are emitted which generates photo-electric current, and photo-electric current is scavenged by the anode 8. By the photo-electric tube 10, the quantum efficiency of the cathode for photo-electron emission is increased and the spectral sensitivity characteristic is improved, as described above, so high sensitive photo-detection becomes possible. Also a photo-multiplier is created if an electronic-multiplying section is installed between the cathode 5 and the anode 8. In the photomultiplier, the cathode 5 can be used as a photo-electric cathode, and can also be used as a dynode, as described below.

Figure 4:
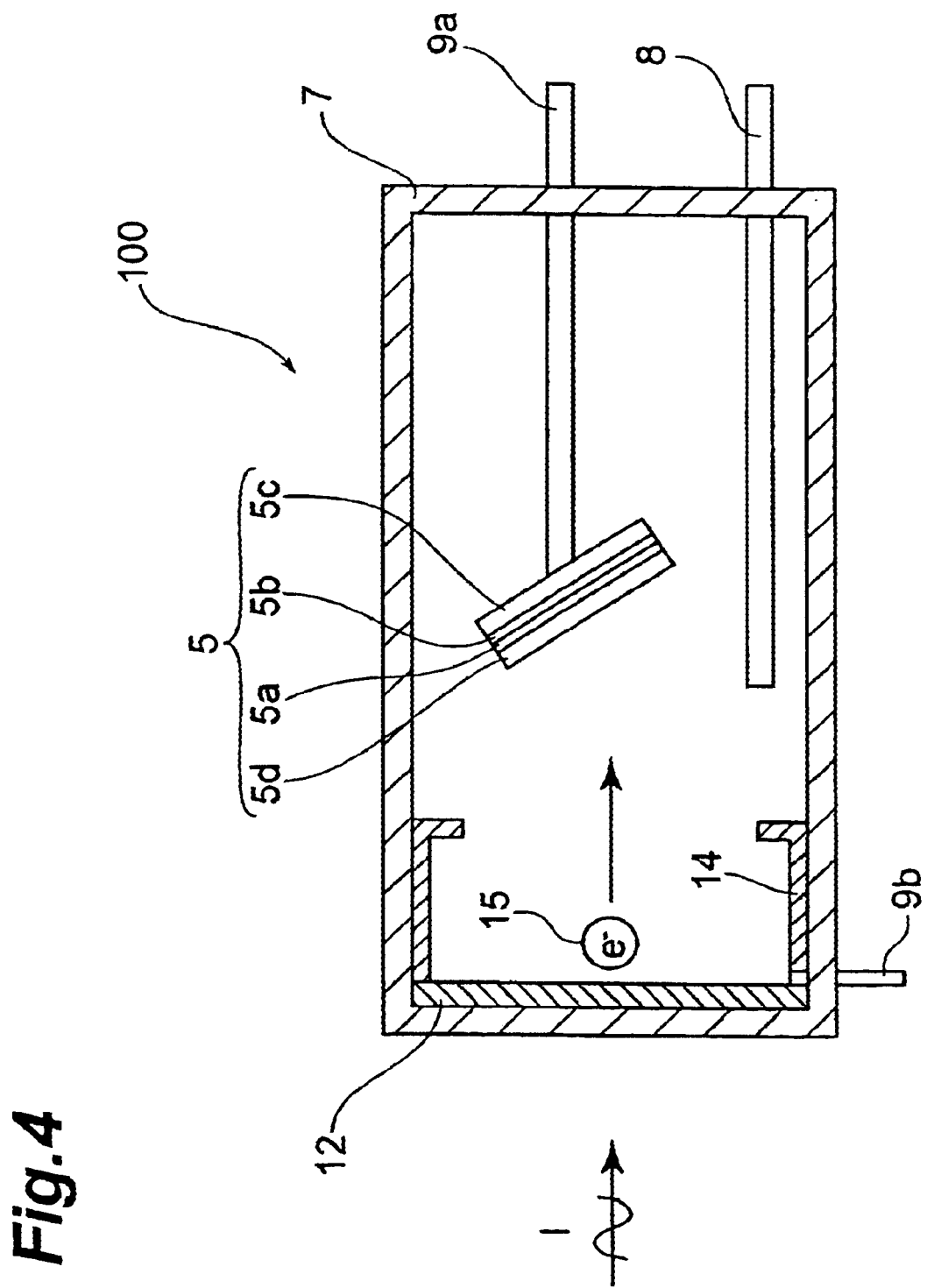
FIG. 4 is a cross-sectional view of a photomultiplier depicting an embodiment of a photomultiplier where the cathode for electron emission is used as a dynode.

FIG. 4 is a cross-sectional view of a photomultiplier depicting an embodiment of the photomultiplier where the above cathode 5 is used as a dynode. The photomultiplier 100 is a transmission type multi-alkali photo-electric face (photo-electric cathode material) 12 formed inside the window section of the glass cylinder 7 (vacuum container), where the electron entering face of the cathode 5 is curved.

The cathode 5 is installed inside the glass cylinder 7. The cathode 5 is a cathode for secondary electron emission 5 where the alkali metal containing layer 5d is formed on the Ni electrode substrate 5c on which the Al layer 5b is deposited via the intermediate layer 5a comprised of carbon nano-tubes. This is for secondary electron emission, but the structure thereof is the same as the above cathode for photo-electron emission. To avoid redundant descriptions, descriptions of the detailed parts of the composing elements are omitted here.

The cathode for secondary electron emission 5 is installed so that the alkali metal containing layer 5d comes to the (primary) electron entering side, and the lead pin 9a is electrically connected to the Ni electrode substrate 5c. Also on the multi-alkali photo-electric face 12, the lead pin 9b and the focusing electrode 14 are electrically connected, and the anode 8 comprised of Ni is also installed inside the glass cylinder 7.

In the photomultiplier 100 with such a configuration, the incident light 1, which is light to be detected, is converted into photo-electrons 15 by the multi-alkali photo-electric face 12. These photo-electrons 15 are accelerated, focused, and enter the cathode for secondary electron emission 5, where the photo-electrons 15 are further multiplied and scavenged by the anode 8. By the photomultiplier 100, the secondary electron emission efficiency of the cathode for secondary electron emission 5 is increased, as described above, so the electron multiplication characteristic is superb, and the amplification rate of incident photons improves, therefore high sensitive light detection is possible.

Figure 5:
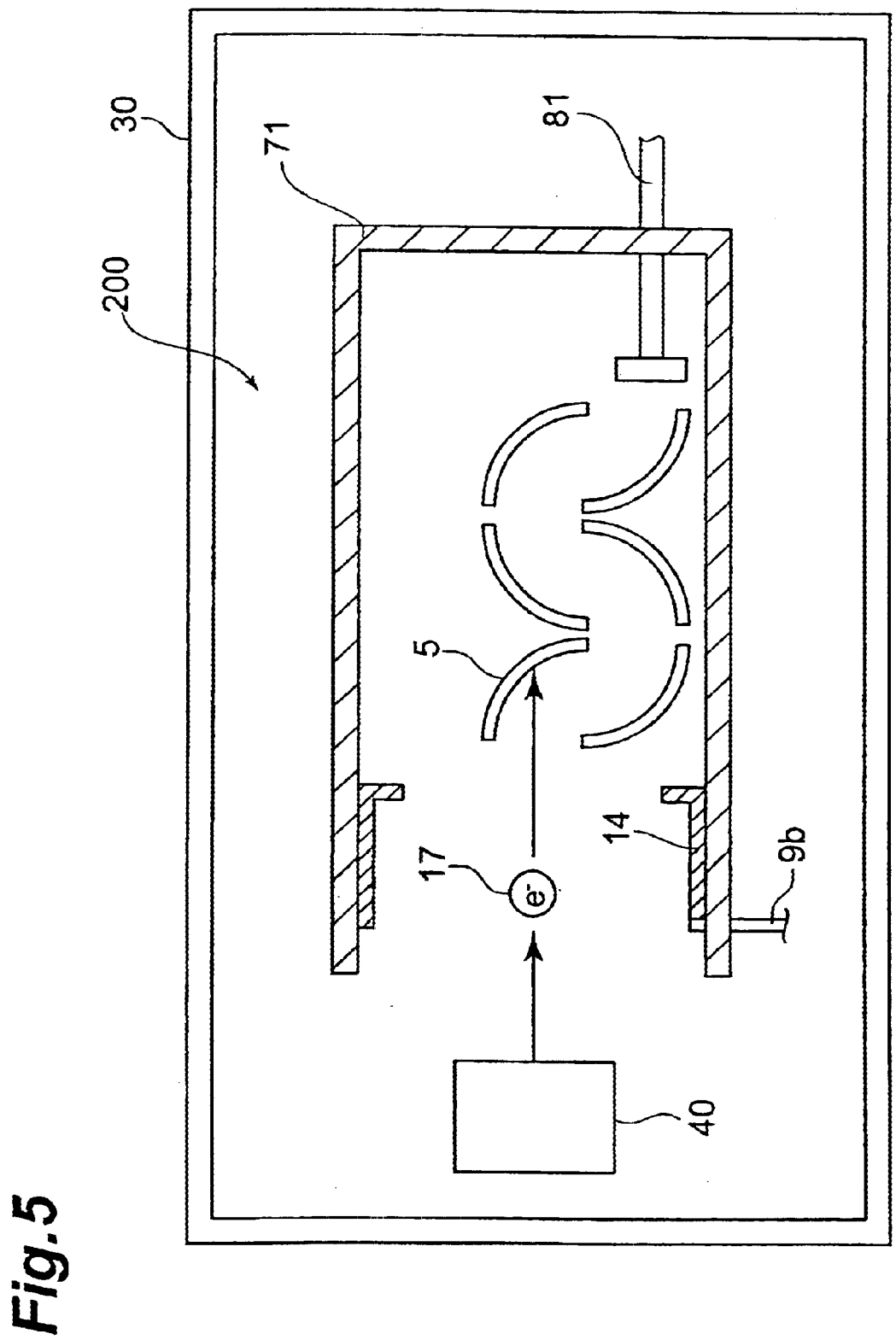
FIG. 5 is a cross-sectional view of an electronic multiplier depicting an embodiment of the electronic multiplier.

FIG. 5 is a cross-sectional view of a multiplier depicting an embodiment of the electronic multiplier. The electronic multiplier 200 is configured such that the above mentioned cathodes for secondary electron emission 5 are disposed in multiple stages as dynodes inside the body 71 (container) which has an opening to which the (primary) electrons 17 can enter, where the anode 81 is installed at the rear side of the cathode for secondary electron emission at the last stage or nearby.

Inside the opening of the body 71, the focusing electrode 14, where the lead pin 9b extending to outside the container 30 is electrically connected, is installed, so that the primary electrons 17 are focused and enter the cathode for secondary electron emission 5 at the first stage. The cathode for secondary electron emission 5 shown in FIG. 5 has the layered structure shown in FIG. 4, except that the shape has a predetermined curvature. A potential lower than that for anode 81 is supplied to each cathode for secondary electron emission 5.

The electronic multiplier 200 with such a configuration is installed, for example, in the chamber 30, which internal pressure is reduced to a predetermined degree of vacuum. An electron emission source 40 is installed in the chamber 30, and the primary electrons 17 emitted from the electron emission source 40 enter inside through the opening of the electronic multiplier 200. When the primary electrons 17 are focused by the focusing electrode 14 and enter the cathode for secondary electron emission 5 at the first stage, secondary electrons are emitted. For these secondary electrons, incidence and emission are repeated while being multiplied by the cathode for secondary electron emission 5 in a subsequent stage, and the electrons emitted from the cathode for secondary electron emission 5 at the last stage enter the anode 81.

Such an electronic multiplier 200 can be suitably applied to the electronic multiplier in an electron microscope, for example. According to this electronic multiplier 200, the secondary electron emission characteristic of the cathode for secondary electron emission 5 has been improved, so the electron multiplication characteristic is superb, and the amplification rate of the primary electrons 17 to enter can be improved. As a result, an object in a field of view of an electron microscope, for example, can be observed at higher sensitivity.

If the above mentioned transmission type cathode for photo-electron emission is used as the multi-alkali photo-electric face 12, then the photomultiplier 100 can be configured as the photomultiplier according to the present invention.

Also a layer comprised of such metal as Cr may be created between the intermediate layer 5a and the Al layer 5b of the cathode for photo-electron emission 5. Then the reflectance of incident light can be further increased by preventing contamination and scratches, and the reaction between Ni of the Ni electrode substrate 5c and Sb of the alkali metal containing layer 5d can be sufficiently prevented by introducing the Cr layer.

To increase the sensitivity of the photomultiplier or the electronic multiplier, a material activation method (e.g. temperature, time, amount of alkali metal, sequence) of the material to be used for the alkali metal containing layer 5d can be appropriately adjusted. In terms of increasing sensitivity, it is preferable that the cathode face and the dynode face of the thin film of the photo-electric face are matched at the maximum sensitivity point. Therefore it is preferable to optimize the balance of the Sb amount and the alkali metal amount of both the cathode face and dynode face.

EXAMPLES

The present invention will now be further described using examples, but the present invention is not limited to these examples.

Example 1

The photo-electric tube 10 with the structure in FIG. 3 was created according to the following procedure.
(1) Al is deposited on the Ni electrode substrate 5c (thickness: 0.127 mm) to form the Al layer 5b (thickness: 100 nm).
(2) A solution of carbon nano-tubes (made by Nippon Yakin, product name: Carbon Nano-tube Type 2 (high content powder)) mixed with ethanol is dropped on the Al layer 5b, then ethanol is evaporated to form the intermediate layer 5a (maximum deposition thickness about 80 nm).
(3) Sb is deposited on the intermediate layer 5a in a hydrogen gas atmosphere to form a porous Sb particulate film.
(4) The above is incorporated into the glass cylinder 7, shown in FIG. 3, the pressure inside the glass cylinder 7 is reduced to be roughly a vacuum, and alkali metal (K, Na, Cs) steam is reacted with the porous Sb particulate film to form the alkali metal containing layer 5d, and as a result, the cathode for photo-electron emission 5, comprised of a multi-alkali antimony compound, is obtained.
(5) Then the glass cylinder 7 is hermetically sealed, and the photo-electric tube 10 is obtained.

As a result of observing the obtained alkali metal containing layer 5d using a scanning electron microscope (SEM), it was confirmed that the multi-alkali particles in the alkali metal containing layer 5d was deposited in a shape closer to elliptical than that of a flattened state.

<Comparison 1>

Figure 8:
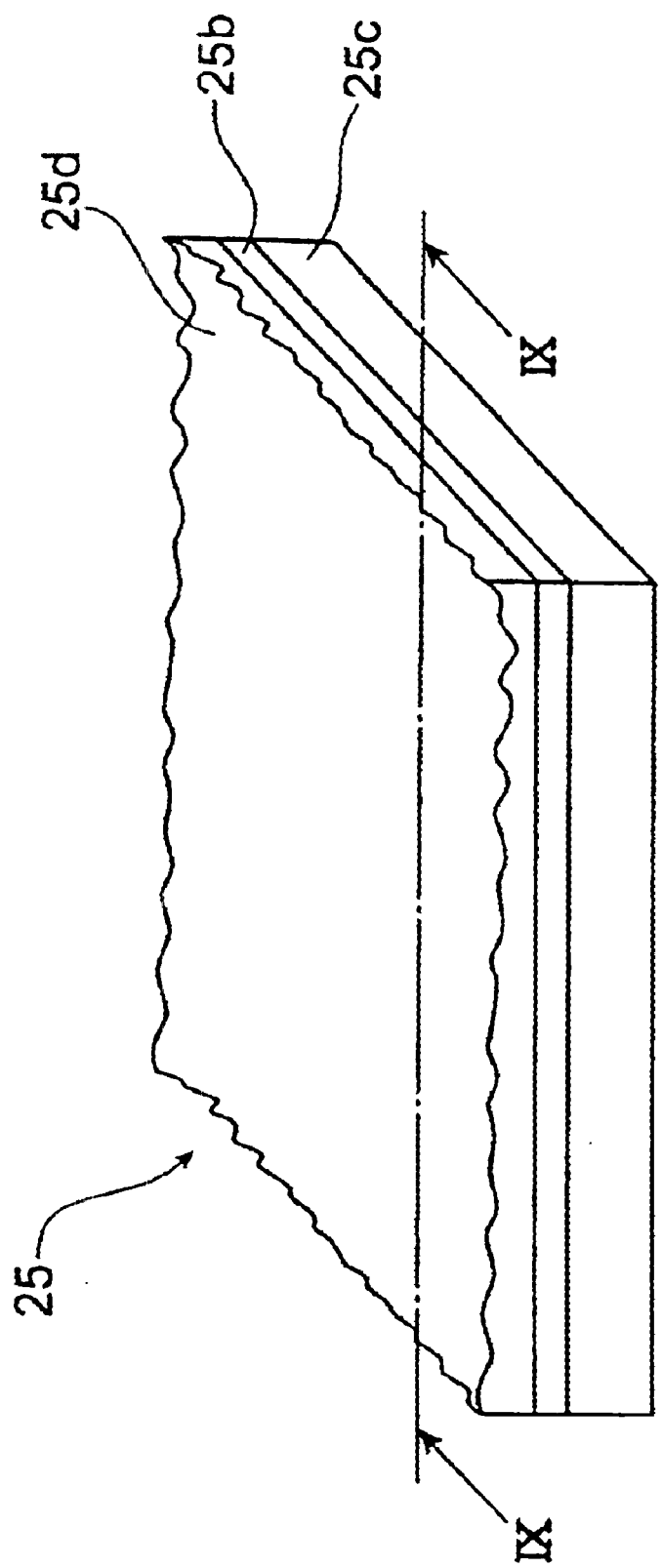
FIG. 8 is a perspective view of a cathode depicting an example of a conventional cathode for photo-electron emission.

A conventional cathode for photo-electron emission 25 (see FIG. 8), where the porous Sb particulate film is directly formed on the Al layer 5b without the intermediate layer 5a, was fabricated in the same way as the above mentioned Example 1, except in this case step (2) in Example 1 was not executed, and the photo-electric tube was obtained. As a result of observing the photo-electric face in this conventional photo-electric tube using SEM, it was confirmed that the multi-alkali particles on the photo-electric face deposited on the Al layer in a flat state.

<Spectral Sensitivity Measurement Test>

Figure 6:
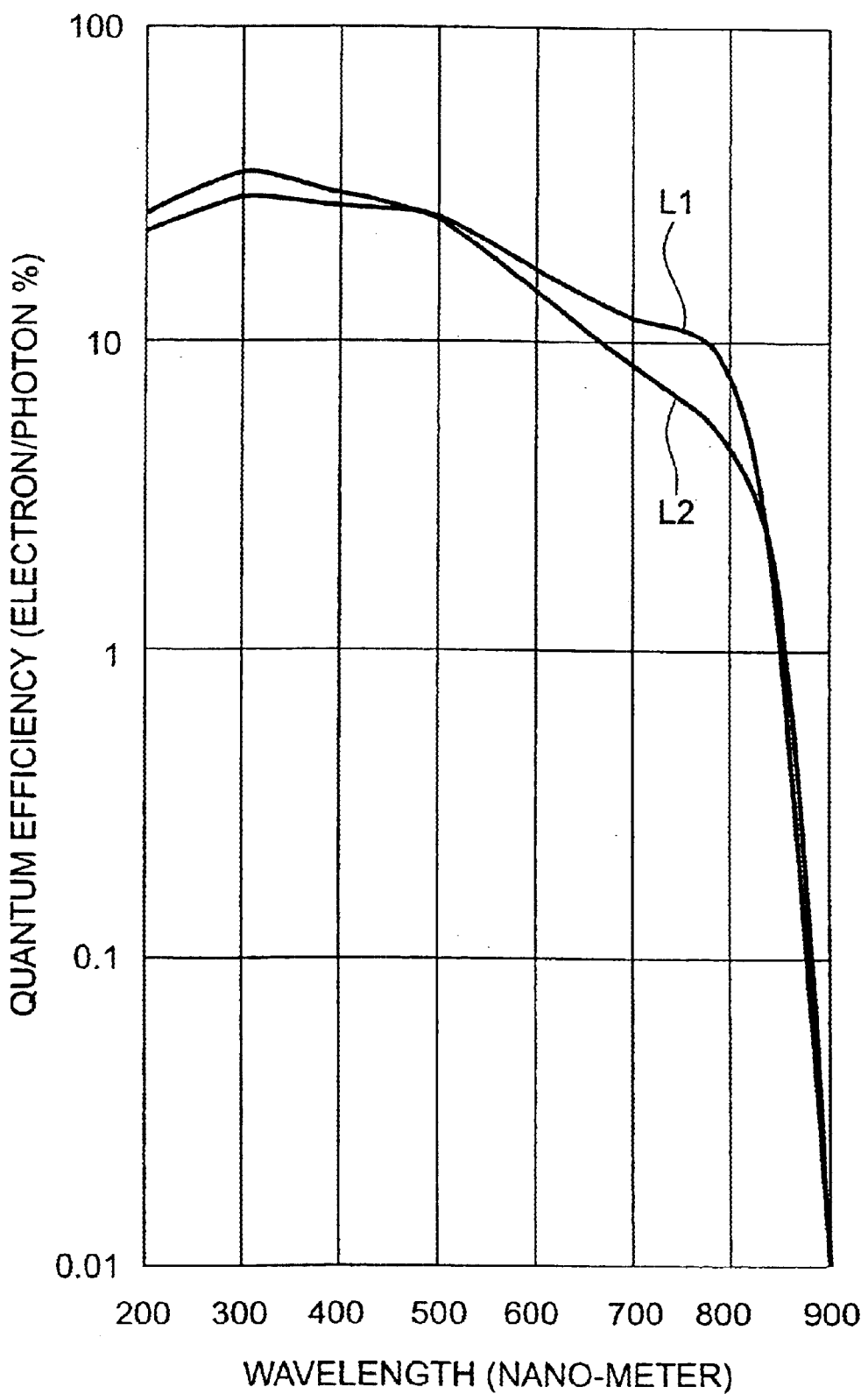
FIG. 6 is a graph depicting the quantum efficiency of the photo-electric tube (photomultiplier) of Example 1 and Comparison 1 with respect to the wavelength of the incident light.

Spectral sensitivity was measured for the cathode for photo-electron emission of the photo-electric tubes fabricated in Example 1 and Comparison 1. FIG. 6 is a graph depicting the quantum efficiency of the photo-electric tubes fabricated in Example 1 and Comparison 1, with respect to the incident light wavelength, where the curves L1 and L2 show the spectral quantum efficiency of the photo-electric tubes of Example 1 and Comparison 1 respectively.

As FIG. 6 shows, it was confirmed that the quantum efficiency of the cathode for photo-electron emission of the present invention has been improved dramatically compared with prior art in the range of wavelengths of about 600 to 850 nm (red—near infra-red region). The quantum efficiency at around wavelength 750 nm (red sensitivity), in particular, is about 1.8 times that of prior art.

At a wavelength of about 400 nm or less, however, the quantum efficiency of the cathode for photo-electron emission of the present invention becomes slightly lower than prior art, but as described above, the quantum efficiency in the red region (red sensitivity) is improved dramatically, and in the sensitivity wavelength region in general, the flatness (uniformity) of sensitivity of the present invention is better than prior art. Therefore from this aspect, it was confirmed that the spectral sensitivity characteristic is improved by the present invention.

Example 2

Using the cathode for photo-electron emission, having the same layer configuration as the above mentioned Example 1, as the cathode for secondary electron emission 5 shown in FIG. 4, the photomultiplier 100 with the same structure shown in FIG. 4 was fabricated.

<Comparison 2>

A conventional electric multiplier was fabricated in the same way as Example 2, except that a cathode for photo-electron emission having the same configuration as the above mentioned Comparison 1 is used as the cathode for secondary electron emission 13, shown in FIG. 4 in this case.

<Secondary Electron Emission Characteristic Measurement Test>

The secondary electron emission characteristic was measured for the cathode for secondary electron emission of the photomultipliers fabricated in Example 2 and Comparison 2.

Figure 7:
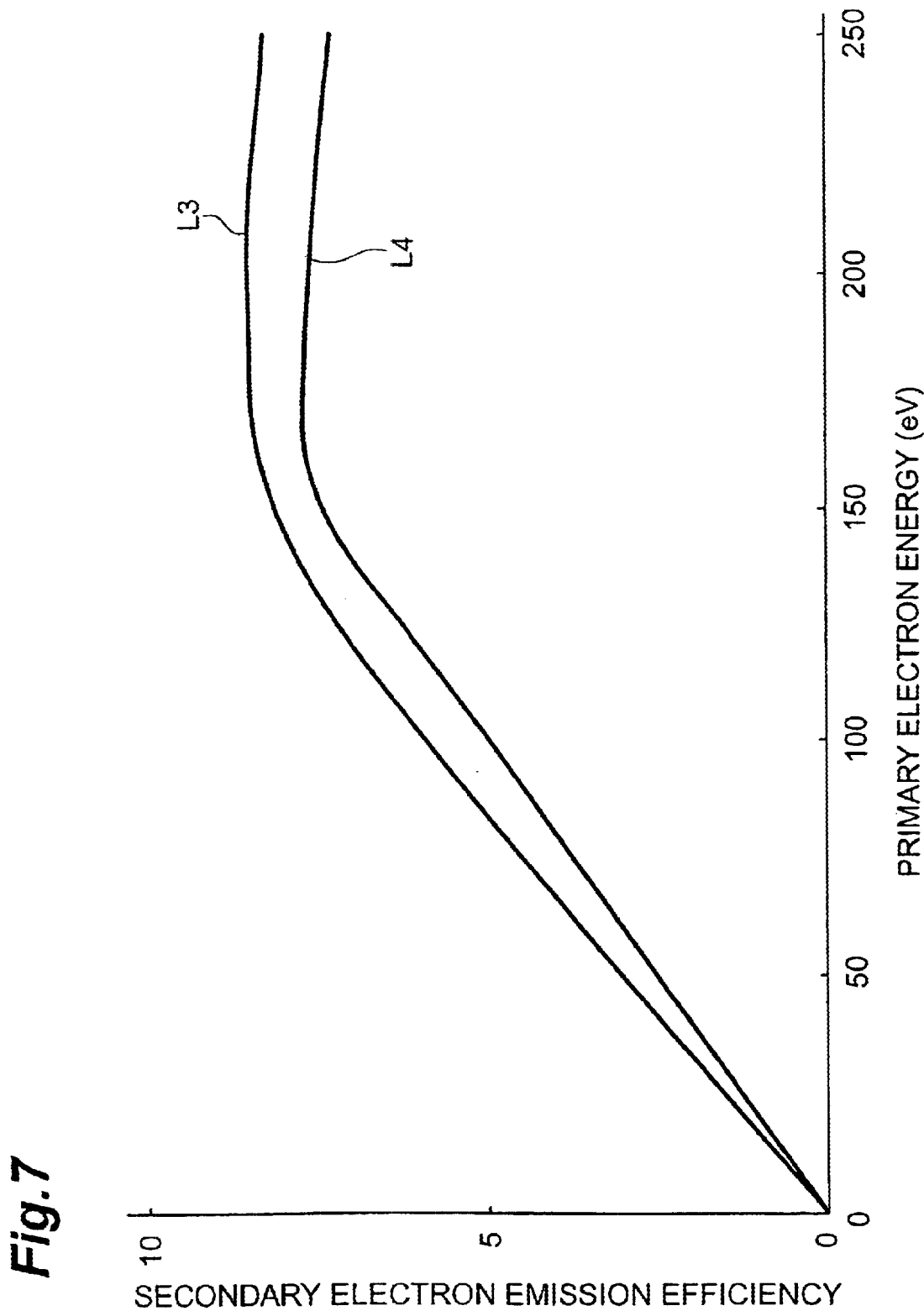
FIG. 7 is a graph depicting the secondary electron emission efficiency of the photomultiplier of Example 2 and Comparison 2 with respect to the primary electron energy.

FIG. 7 is a graph depicting the secondary electron emission efficiency with respect to the primary electron energy of the electronic multipliers fabricated in Example 2 and Comparison 2, where the curves L3 and L4 show the secondary electron emission efficiency of the photo-electric tubes of Example 2 and Comparison 2 respectively. As FIG. 7 shows, it was confirmed that the secondary electron emission efficiency of the electronic multiplier of the present invention improved remarkably compared with prior art.

As described above, according to the above mentioned cathode for photo-electron or secondary electron emission, the quantum efficiency can be improved compared with prior art, particularly the quantum efficiency with respect to incident light having a wavelength primarily in the red region (red sensitivity) can be improve dramatically, since the quantum efficiency in the red region can be improved, and the flatness of the spectral sensitivity in the entire sensitivity wavelength region can be improved, the spectral sensitivity characteristic can be sufficiently improved. Also according to the present invention, an electrode for secondary electron emission, where secondary electron emission efficiency is improved much more than prior art, can be obtained. Also according to the present invention, a photo-multiplier and electronic multiplier with an extremely superb photo-electron emission characteristic and secondary electron emission characteristic can be obtained using the cathodes for photo-electron and secondary electron emission of the present invention.

INDUSTRIAL APPLICABILITY

The present invention can be used for an electron emission cathode and photomultiplier.

What is claimed is:

1. A cathode for photo-electron or secondary electron emission, comprising a thin film that is made of material for emitting photo-electrons by the entry of light or for emitting secondary electrons by the entry of electrons and is formed on a substrate, characterized in that an intermediate layer containing carbon is disposed between said thin film and said substrate, and said intermediate layer contains fullerene of carbon.

2. The cathode for photo-electron or secondary electron emission according to claim 1, characterized in that said thin film is activated using alkali metal.

3. The cathode for photo-electron or secondary electron emission according to claim 1, characterized in that said thin film is comprised of a compound which consists of at least one type of alkali metal and antimony.

4. A photomultiplier, characterized in that the cathode for photo-electron emission according to claim 1 is disposed inside a vacuum container having a light entrance window, and photo-electrons which are emitted from said cathode for photo-electron emission by the incident light are multiplied inside said vacuum container.

5. An electronic multiplier, characterized in that said cathodes for secondary electron emission according to claim 1 is installed in multiple stages inside a container, so that electrons to be detected enter said cathode for secondary electron emission at the first stage, the secondary electrons emitted by said cathode for secondary electron emission at the last stage enter the anode.

6. A cathode for photo-electron or secondary electron emission, having a thin film that is made of material for emitting photo-electrons by the entry of light or for emitting secondary electrons by the entry of electrons and is formed on a substrate, characterized in that an intermediate layer containing carbon is disposed between said thin film and said substrate, and said intermediate layer contains carbon nano-tubes.

7. The cathode for photo-electron or secondary electron emission according to claim 6, characterized in that said thin film is activated using alkali metal.

8. The cathode for photo-electron or secondary electron emission according to claim 6, characterized in that said thin film is comprised of a compound which consists of at least one type of alkali metal and antimony.

9. A photomultiplier, characterized in that the cathode for photo-electron emission according to claim 6 is disposed inside a vacuum container having a light entrance window, and photo-electrons which are emitted from said cathode for photo-electron emission by the incident light are multiplied inside said vacuum container.

10. An electronic multiplier, characterized in that said cathodes for secondary electron emission according to claim 6 is installed in multiple stages inside a container, so that electrons to be detected enter said cathode for secondary electron emission at the first stage, the secondary electrons emitted by said cathode for secondary electron emission at the last stage enter the anode.

\* \* \* \* \*